United States Patent
Tokizaki

(10) Patent No.: US 11,345,390 B2
(45) Date of Patent: May 31, 2022

(54) STEERING DEVICE

(71) Applicant: YAMADA MANUFACTURING CO., LTD., Kiryu (JP)

(72) Inventor: Kyohei Tokizaki, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/174,624

(22) Filed: Feb. 12, 2021

(65) Prior Publication Data

US 2021/0300455 A1  Sep. 30, 2021

(30) Foreign Application Priority Data

Mar. 27, 2020 (JP) .............................. JP2020-058295
Dec. 14, 2020 (JP) .............................. JP2020-207079

(51) Int. Cl.
*B62D 1/185* (2006.01)
*B62D 1/181* (2006.01)

(52) U.S. Cl.
CPC ............. *B62D 1/185* (2013.01); *B62D 1/181* (2013.01)

(58) Field of Classification Search
CPC ................................ B62D 1/185; B62D 1/181
See application file for complete search history.

(56) References Cited

U.S. PATENT DOCUMENTS

| | | | | |
|---|---|---|---|---|
| 2006/0028010 A1* | 2/2006 | Yamada | ................. | B62D 1/184 280/775 |
| 2009/0200783 A1* | 8/2009 | Cymbal | ................. | B62D 1/185 280/775 |
| 2015/0135882 A1* | 5/2015 | Rauber | ................. | B62D 1/181 74/493 |
| 2018/0009463 A1* | 1/2018 | Yoshihara | ............. | B62D 1/185 |
| 2019/0061802 A1* | 2/2019 | Inoue | ...................... | F16H 25/20 |

FOREIGN PATENT DOCUMENTS

| | | | | |
|---|---|---|---|---|
| CN | 107000780 A | * | 8/2017 | ............ B62D 1/185 |
| JP | 2004-322879 | | 11/2004 | |

* cited by examiner

*Primary Examiner* — Drew J Brown
(74) *Attorney, Agent, or Firm* — Rankin, Hill & Clark LLP

(57) ABSTRACT

A steering device according to an embodiment includes a pipe, a housing, and a telescopic mechanism. The housing includes a first support portion which supports the pipe from below, and a second support portion and a third support portion which support the pipe from above. A central angle of the pipe formed by any one contact point of a contact point between an outer peripheral surface of the pipe and the second support portion and a contact point between the outer peripheral surface of the pipe and the third support portion, and an intersection point between a center line and the outer peripheral surface of the pipe is set in a range of 45° to 60°.

4 Claims, 5 Drawing Sheets

STEERING DEVICE

BACKGROUND OF THE INVENTION

Field of the Invention

Priority is claimed on Japanese Patent Application No. 2020-058295, filed on Mar. 27, 2020 and Japanese Patent Application No. 2020-207079, filed on Dec. 14, 2020, the contents of which are incorporated herein by reference.

The present disclosure relates to a steering device.

Description of Related Art

A steering device is provided with a telescopic function of adjusting front and rear positions of a steering wheel in accordance with a body difference or a driving posture of a driver. This type of the steering device includes a cylindrical housing supported by a vehicle body, a tube held inside the housing and movable in a front-rear direction, and a telescopic mechanism for connecting the housing and the tube and movable forward and rearward. The tube rotatably supports a steering shaft to which a steering wheel is mounted.

In a steering device, in order to prevent rattling of the tube with respect to the housing, a configuration is known in which an outer peripheral surface of the tube is supported at three points by the housing (for example, refer to Japanese Unexamined Patent Application, First Publication No. 2004-322879).

Specifically, in Japanese Unexamined Patent Application, First Publication No. 2004-322879, the tube is supported from below by an adjusting screw provided in the housing. The tube is supported from above at two locations in both right and left end edges of a recess groove provided in the housing.

However, in the related art, there is still room for improvement in that a displacement amount (rigidity) of a tube with respect to a housing needs to keep balance in an up-down direction and a left-right direction.

SUMMARY OF THE INVENTION

An aspect according to the present disclosure is to provide a steering device capable of improving a commercial value by suppressing variations in a displacement amount of a pipe with respect to a housing in an up-down direction and a left-right direction.

In order to solve the above-described problem, the present disclosure adopts the following aspects.

(1) According to an aspect of the present disclosure, there is provided a steering device including a pipe into which a steering shaft is inserted to be rotatable around an axis along a front-rear direction, a housing supported by a vehicle body and supporting the pipe to be movable in the front-rear direction, and a telescopic mechanism moving the pipe with respect to the housing in the front-rear direction. The housing includes a first support portion located on a center line passing through the axis along an up-down direction, and supporting the pipe from a first side in the up-down direction, a second support portion located on a first side in a circumferential direction around the axis with respect to the center line, and supporting the pipe from a second side in the up-down direction, and a third support portion located on a second side in the circumferential direction around the axis with respect to the center line, and supporting the pipe from the second side in the up-down direction. When the pipe is viewed in the front-rear direction, a central angle of the pipe formed by any one contact point of a contact point between an outer peripheral surface of the pipe and the second support portion and a contact point between the outer peripheral surface of the pipe and the third support portion, and an intersection point between the center line and the outer peripheral surface of the pipe is set in a range of 45° to 60°.

According to this aspect, since the central angle is set to 45° or larger, one contact point is separated from the center line. In this manner, the pipe can be easily held in a left-right direction, and a displacement amount of the pipe in the left-right direction can be reduced.

On the other hand, since the central angle is set to 60° or smaller, it is possible to prevent an excessive increase in the displacement amount of the pipe in the up-down direction.

As a result, the respective support portions can be evenly and easily disposed in the circumferential direction of the pipe. Therefore, a difference (variation) in the displacement amounts in the respective directions can fall within a predetermined range. In this manner, the pipe can be stably supported by the housing, and a commercial value can be improved.

(2) In the steering device according to the aspect (1), it is preferable that the central angle is set in a range of 45° to 50°.

Incidentally, a load tends to be more easily applied to the pipe in the up-down direction than in the left-right direction. Therefore, an occupant tends to feel a sense of discomfort in displacement in the up-down direction than displacement in the left-right direction.

According to this aspect, since the central angle is set in the range of 45° to 50°, for example, the displacement amount can be reduced in the left-right direction while reliably suppressing an increase in the displacement amount in the up-down direction.

(3) In the steering device according to the aspect (1), it is preferable that the central angle is set in a range of 55° to 60°.

According to this aspect, the difference in the displacement amounts in the respective directions can be reduced. It is possible to suppress variations in the displacement amount of the pipe with respect to the housing in the up-down direction and the left-right direction.

(4) In the steering device according to any one of the aspects (1) to (3), a notch that is open inward in a radial direction intersecting with the axis may be formed in a portion of the housing which is located between the second support portion and the third support portion. It is preferable that the second support portion and the third support portion are side end edges facing each other in the circumferential direction, out of opening edges of the notch.

According to this aspect, contact between the housing and the pipe can be avoided by the notch, and the pipe can be stably supported by the side end edges facing each other in the circumferential direction out of the opening edges of the notch. In this case, for example, compared to a case where the support portion is formed by a projection, a working amount of the pipe for forming the support portion can be reduced. As a result, workability or rigidity of the support portion can be improved.

(5) In the steering device according to the aspect (4), the housing may have a recess portion recessed from a bottom surface of the notch and having a narrower width in the circumferential direction than that of the notch. It is preferable that a coupling portion for coupling the telescopic mechanism and the pipe is disposed inside the recess portion.

According to this aspect, a position of the support portion can be set regardless of a size of the recess portion by forming the notch separately from the recess portion. In this manner, it is easy to set the central angle to a desired value.

(6) In the steering device according to any one of the aspects (1) to (5), it is preferable that the telescopic mechanism includes an actuator provided in the housing, and a feed mechanism for connecting the pipe and the actuator to each other, and transmitting a driving force of the actuator to the pipe.

According to this aspect, even in an electric telescopic mechanism, the pipe can be stably supported by each of the support portions. Therefore, it is possible to suppress variations in the displacement amount of the pipe with respect to the housing main body in the up-down direction and the left-right direction. As a result, a commercial value can be improved.

According to the above-described respective aspects, the commercial value can be improved by suppressing variations in the displacement amount of the pipe with respect to the housing in the up-down direction and the left-right direction.

DETAILED DESCRIPTION OF THE INVENTION

Figure 1:
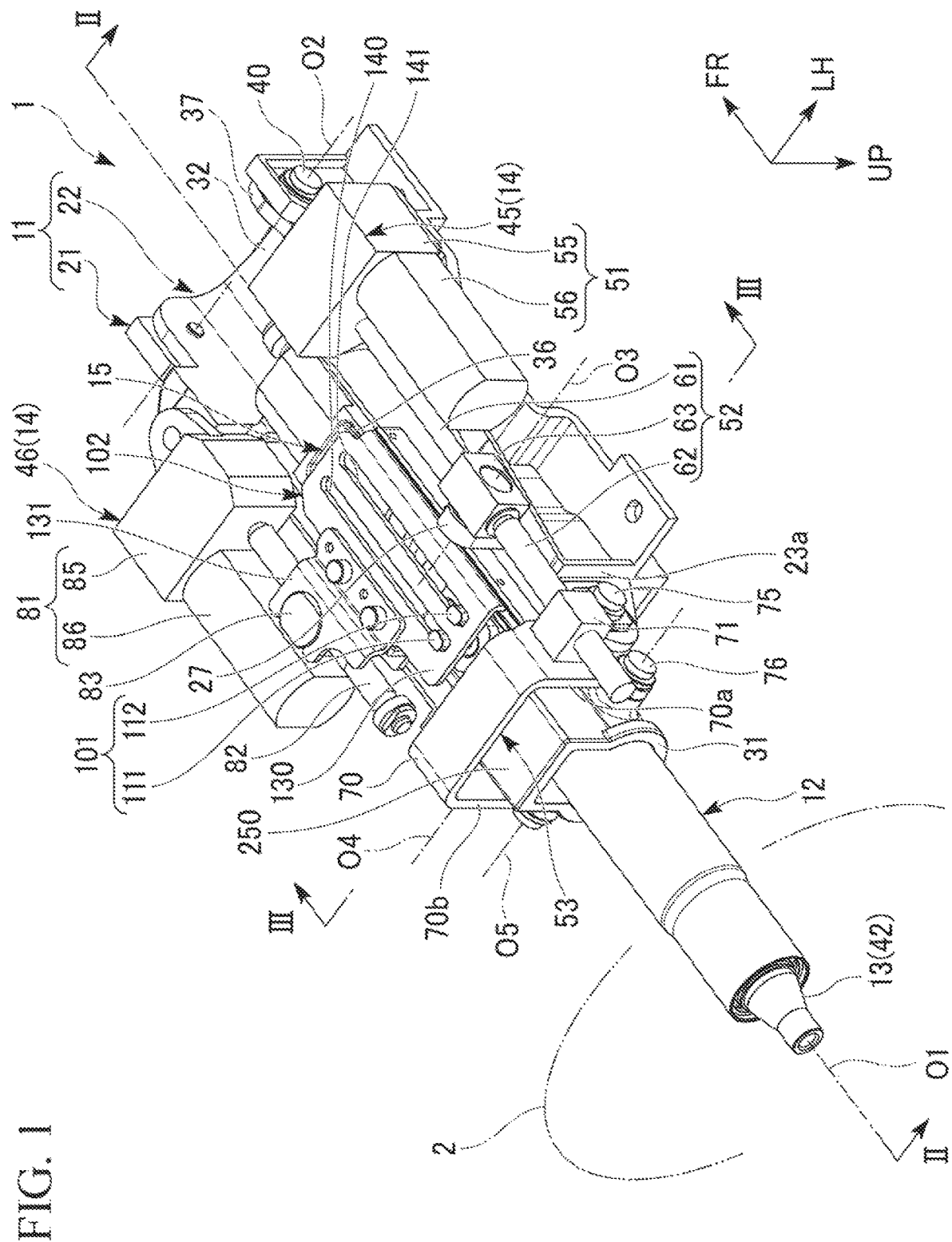
FIG. 1 is a perspective view of a steering device.

Hereinafter, an embodiment according to the present disclosure will be described with reference to the drawings. In the embodiments or modification examples described below, the same reference numerals will be assigned to corresponding configurations, and description thereof may be omitted in some cases. In the following description, for example, expressions indicating relative or absolute dispositions such as "parallel", "perpendicular", "center", and "coaxial" not only strictly represent the disposition, but also represent a state of relative displacement with an angle or a distance to such an extent that tolerances or the same functions can be obtained.

[Steering Device 1]

FIG. 1 is a perspective view of a steering device 1.

As illustrated in FIG. 1, the steering device 1 is mounted on a vehicle. The steering device 1 adjusts a steering angle of vehicle wheels in accordance with a rotational operation of a steering wheel 2.

The steering device 1 includes a housing 11, a pipe 12, a steering shaft 13, a drive mechanism 14, and a load absorbing mechanism 15. The pipe 12 and the steering shaft 13 are respectively formed along an axis O1. Therefore, in the following description, an extending direction of the axis O1 of the pipe 12 and the steering shaft 13 will be simply referred to as a shaft axial direction, a direction perpendicular to the axis O1 will be simply referred to as a shaft radial direction, and a direction around the axis O1 will be simply referred to as a shaft circumferential direction, in some cases.

The steering device 1 according to the present embodiment is mounted on the vehicle in a state where the axis O1 intersects with a front-rear direction. Specifically, the axis O1 of the steering device 1 extends upward as the steering device 1 is directed rearward. However, in the following description, for the sake of convenience, in the steering device 1, a direction toward the steering wheel 2 in the shaft axial direction will be simply referred to as rearward, and a direction toward a side opposite to the steering wheel 2 will be simply referred to as forward (arrow FR). In the shaft radial direction, an up-down direction in a state where the steering device 1 is attached to the vehicle will be simply referred to as an up-down direction (arrow UP represents upward), and a left-right direction in the same state will be simply referred to as a left-right direction (arrow LH represents a left side).

<Housing 11>

Figure 2:
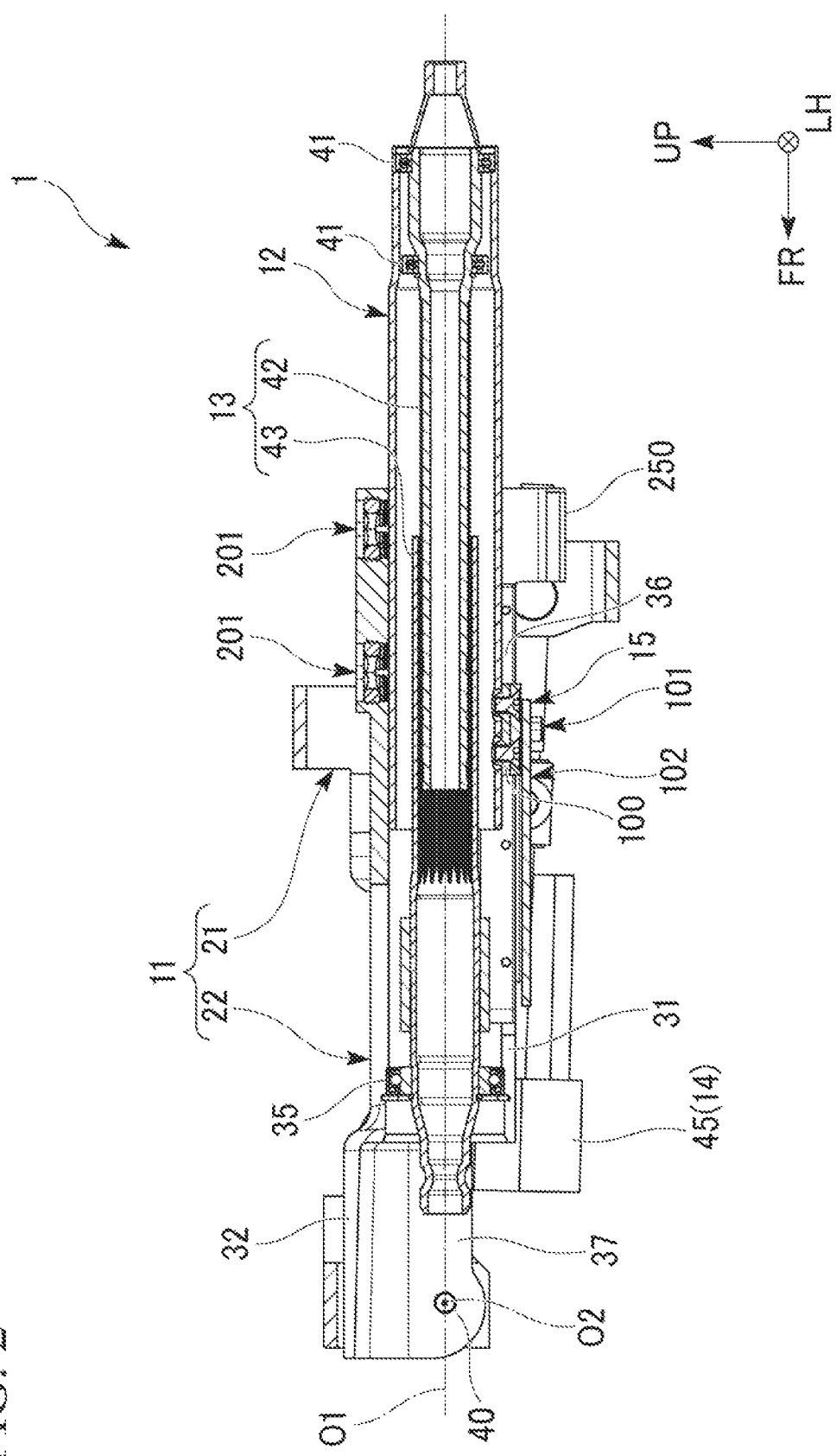
FIG. 2 is a sectional view taken along line II-II in FIG. 1.
Figure 3:
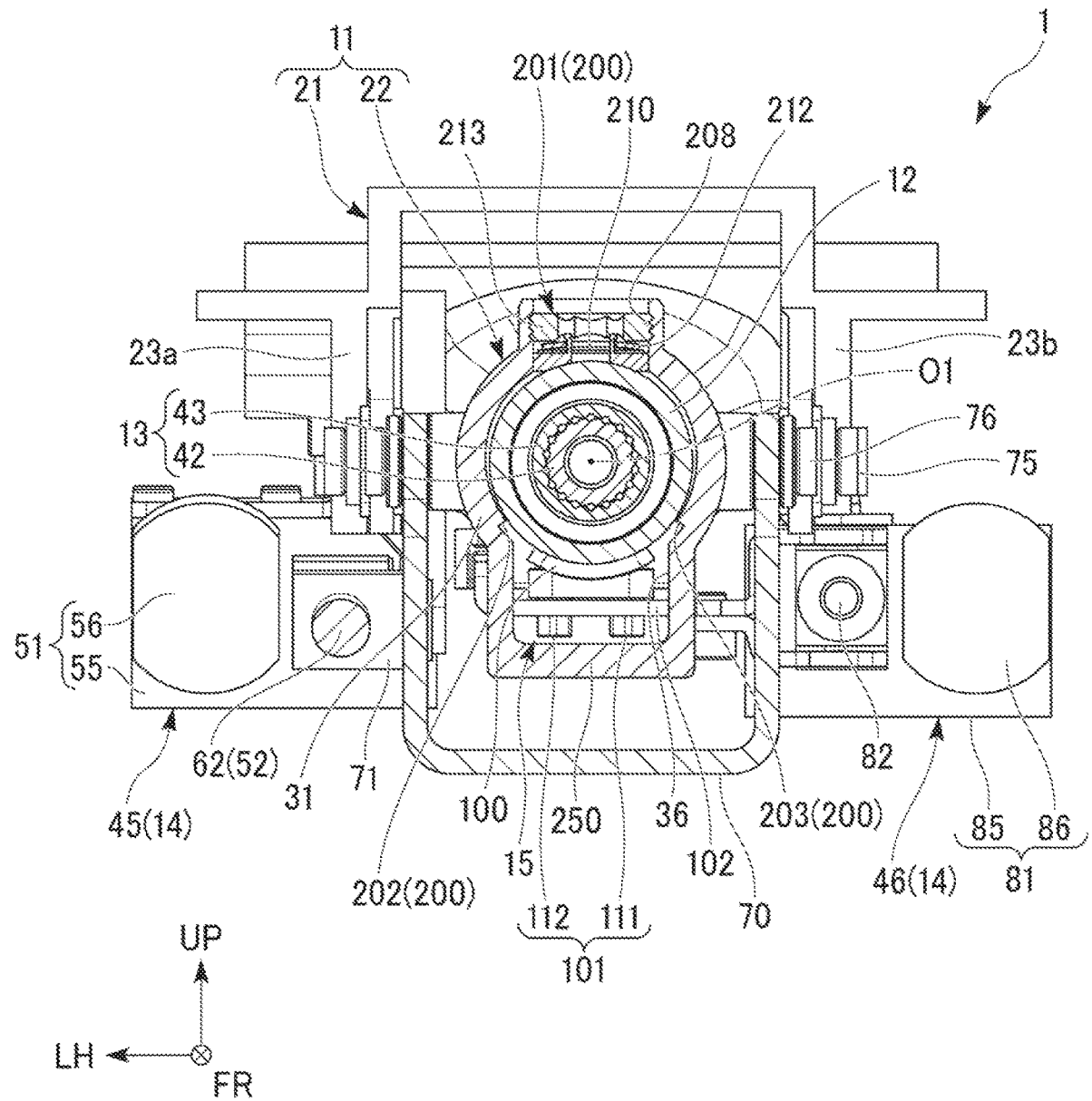
FIG. 3 is a sectional view taken along line in FIG. 1.

FIG. 2 is a sectional view taken along line II-II in FIG. 1.
FIG. 3 is a sectional view taken along line III-III in FIG. 1.

As illustrated in FIGS. 1 to 3, the housing 11 includes a tilt bracket 21 and a housing main body 22.

The tilt bracket 21 includes a pair of right and left side frames 23a and 23b.

The side frames 23a and 23b extend in the front-rear direction while the left-right direction is used as a thickness direction. Out of lower end edges of the side frames 23a and 23b, a protruding piece 27 protruding downward is formed in a front end portion of the side frame 23a on one side (the left side).

The housing main body 22 is disposed inside the tilt bracket 21. The housing main body 22 has a holding cylinder 31 and a front extending portion 32.

The holding cylinder 31 is formed in a cylindrical shape extending in the shaft axial direction (front-rear direction). As illustrated in FIG. 2, an outer ring of a front side bearing 35 is fitted (press-fitted) to a front end portion inside the holding cylinder 31. As illustrated in FIGS. 1 to 3, a slit 36 is formed in an intermediate portion of the holding cylinder 31 in the front-rear direction. The slit 36 extends in the front-rear direction. A bridge portion 250 laid across the slit 36 from below is formed in a rear end portion of the holding cylinder 31. The bridge portion 250 has a U-shape which is open upward when viewed in the front-rear direction (front view). Both end portions in the bridge portion 250 in the left-right direction are respectively connected to end edges facing each other in the left-right direction in the slit 36.

As illustrated in FIG. 1, the front extending portion 32 protrudes forward from the holding cylinder 31. The front extending portion 32 is formed in a U-shape which is open downward in a sectional view perpendicular to the front-rear direction. In the illustrated example, the front extending portion 32 includes a pair of side walls 37 facing each other in the left-right direction. A distance between the pair of side walls 37 is longer than an outer diameter of the holding cylinder 31. The side walls 37 are respectively coupled to the side frames 23a and 23b facing each other in the tilt bracket 21 via a pivot shaft 40. In this manner, the housing main body 22 is supported by the tilt bracket 21 to be pivotable around the pivot shaft 40 (around the axis O2 extending in the left-right direction).

<Pipe 12>

The pipe 12 is formed in a cylindrical shape extending in the shaft axial direction. The pipe 12 is inserted into the holding cylinder 31. The pipe 12 is configured to be movable in the shaft axial direction with respect to the holding cylinder 31. As illustrated in FIG. 2, an outer ring of a rear side bearing 41 is fitted (press-fitted) to a rear end portion of the pipe 12. In the present embodiment, an outer diameter D (refer to FIG. 4) of the pipe 12 is set to approximately 30 mm to 50 mm.

<Steering Shaft 13>

The steering shaft 13 includes an inner shaft 42 and an outer shaft 43.

The inner shaft 42 is formed in a cylindrical shape extending in the shaft axial direction. The inner shaft 42 is inserted into the pipe 12. A rear end portion of the inner shaft 42 is press-fitted to an inner ring of the rear side bearing 41. In this manner, the inner shaft 42 is supported to be rotatable around the axis O1 via the rear side bearing 41. The steering wheel 2 is coupled to a portion protruding rearward from the pipe 12 in the inner shaft 42. The inner shaft 42 may be solid.

The outer shaft 43 is formed in a cylindrical shape extending in the shaft axial direction. The outer shaft 43 is inserted into the pipe 12. The inner shaft 42 is inserted into a rear end portion of the outer shaft 43 inside the pipe 12. A front end portion of the outer shaft 43 is press-fitted to an inner ring of the front side bearing 35 inside the holding cylinder 31. In this manner, the outer shaft 43 is supported to be rotatable around the axis O1 inside the holding cylinder 31.

The inner shaft 42 and the pipe 12 are configured to be movable in the shaft axial direction with respect to the outer shaft 43. An outer peripheral surface of the inner shaft 42 has a male spline, for example. The male spline engages with a female spline formed on an inner peripheral surface of the outer shaft 43. In this manner, relative rotation with respect to the outer shaft 43 is restricted, and the inner shaft 42 moves in the shaft axial direction with respect to the outer shaft 43. However, a telescopic structure or a rotation restriction structure of the steering shaft 13 can be appropriately changed. In the present embodiment, a configuration has been described in which the outer shaft 43 is located forward of the inner shaft 42. However, without being limited to this configuration, the present disclosure may adopt a configuration in which the outer shaft 43 is located rearward of the inner shaft 42.

<Drive Mechanism 14>

As illustrated in FIG. 1, the drive mechanism 14 includes a tilt mechanism 45 and a telescopic mechanism 46. For example, the tilt mechanism 45 is disposed on the left side of the housing 11. For example, the telescopic mechanism 46 is disposed on the right side of the housing 11. The drive mechanism 14 may have at least the telescopic mechanism 46.

The tilt mechanism 45 forms a so-called feed screw mechanism. Specifically, the tilt mechanism 45 includes a tilt motor unit 51, a tilt coupling portion 52, and a tilt movable portion 53. The tilt mechanism 45 switches between restriction and allowance of the steering device 1 pivoting around the axis O2 by driving the tilt motor unit 51.

The tilt motor unit 51 includes a tilt gear box 55 and a tilt motor 56.

The tilt gear box 55 is attached to a front end portion of the side frame 23a in a state of projecting outward from the side frame 23a in the left-right direction.

The tilt motor 56 is attached to the tilt gear box 55 from the rear in a state where an output shaft (not illustrated) is oriented forward. The output shaft of the tilt motor 56 is connected to a speed reduction mechanism (not illustrated) inside the tilt gear box 55.

The tilt coupling portion 52 includes a tilt wire 61, a tilt shaft 62, and a tilt coupling 63 that couples the tilt wire 61 and the tilt shaft 62 to each other.

The tilt coupling 63 is supported by a protruding piece 27 to be rotatable around an axis O3 extending in the left-right direction.

The tilt wire 61 is laid between the tilt gear box 55 and the tilt coupling 63. The tilt wire 61 is configured to be rotatable in accordance with driving of the tilt motor 56. The tilt wire 61 is configured to be flexibly deformable. A connection member connecting the tilt gear box 55 and the tilt coupling 63 to each other is not limited to those which are flexibly deformable like the tilt wire 61. That is, depending on a layout of the tilt gear box 55 and the tilt coupling 63, the tilt gear box 55 and the tilt coupling 63 may be connected to each other by a connection member which does not flexibly deform.

The tilt shaft 62 is laid between the tilt coupling 63 and the tilt movable portion 53. The tilt shaft 62 is rotated together with the tilt wire 61 in accordance with the driving of the tilt motor 56. A male screw portion is formed on an outer peripheral surface of the tilt shaft 62.

The tilt movable portion 53 includes a link member 70 and a tilt nut 71.

The link member 70 is formed in a U-shape which is open upward. The link member 70 has side walls 70a and 70b facing each other in the left-right direction. The side wall 70a is interposed between the holding cylinder 31 and the side frame 23a. The side wall 70b is interposed between the holding cylinder 31 and the side frame 23b.

The side wall 70a and the side frame 23a, and the side wall 70b and the side frame 23b are respectively coupled to each other by first bolts 75 and 75 extending in the left-right direction. In this manner, the link member 70 is supported by the tilt bracket 21 to be pivotable around an axis O4 extending in the left-right direction.

The side wall 70a and the holding cylinder 31, and the side wall 70b and the holding cylinder 31 are respectively coupled to each other by second bolts 76 and 76 extending in the left-right direction. The second bolts 76 and 76 are located behind the first bolts 75 and 75. In this manner, the link member 70 is supported by the holding cylinder 31 to be pivotable around an axis O5 extending parallel to the axis O4.

The tilt nut 71 is attached to a lower portion of the side wall 70a. A female screw portion is formed on an inner peripheral surface of the tilt nut 71. The tilt shaft 62 is screwed to the tilt nut 71. The tilt nut 71 is configured so that a position on the tilt shaft 62 can be changed in accordance with the rotation of the tilt shaft 62.

The telescopic mechanism 46 forms a so-called feed screw mechanism.

Specifically, the telescopic mechanism 46 includes a telescopic motor unit (actuator) 81, a telescopic coupling portion 82, and a telescopic movable portion 83. The telescopic mechanism 46 switches between restriction and allowance of forward and rearward movements of the pipe 12 (steering shaft 13) with respect to the housing 11 by driving the telescopic motor unit 81.

The telescopic motor unit 81 includes a telescopic gear box 85 and a telescopic motor 86.

The telescopic gear box 85 is attached to the front extending portion 32 in a state of projecting outward from the side wall 37 in the left-right direction.

The telescopic motor 86 is attached to the telescopic gear box 85 from behind in a state where an output shaft (not illustrated) is oriented forward. The output shaft of the telescopic motor 86 is connected to a speed reduction mechanism inside the telescopic gear box 85.

The telescopic coupling portion 82 extends rearward from the telescopic gear box 85. The telescopic coupling portion 82 rotates around the axis in accordance with the driving of the telescopic motor 86. A male screw portion is formed on an outer peripheral surface of the telescopic coupling portion 82.

The telescopic movable portion 83 is connected to the pipe 12 via the load absorbing mechanism 15. A female screw portion is formed on an inner peripheral surface of the telescopic movable portion 83. The telescopic coupling portion 82 is screwed to the telescopic movable portion 83. That is, the telescopic movable portion 83 is configured to engage with the male screw portion in the front-rear direction via the female screw portion, and to be movable on the telescopic coupling portion 82 in accordance with the rotation of the telescopic coupling portion 82.

<Load Absorbing Mechanism 15>

As illustrated in FIGS. 1 to 3, the load absorbing mechanism 15 connects the telescopic movable portion 83 and the pipe 12 to each other. Specifically, the load absorbing mechanism 15 includes a hanger bracket 100, an energy absorbing (EA) block 101, and an EA plate 102.

The hanger bracket 100 is fixed to a lower portion of the pipe 12 in a front portion of the pipe 12. In the present embodiment, the hanger bracket 100 is fixed to the outer peripheral surface of the pipe 12 by means of welding. The hanger bracket 100 is disposed inside the slit 36.

The EA block 101 is provided below the hanger bracket 100. For example, the EA block 101 is integrally formed of a sintered material having an iron-based material. The EA block 101 is fixed to the hanger bracket 100 by means of screwing in a state of overlapping the hanger bracket 100 from below. The EA block 101 may be directly fixed to the pipe 12.

As illustrated in FIG. 1, the EA block 101 includes a first sliding portion 111 and a second sliding portion 112. The first sliding portion 111 and the second sliding portion 112 extend in the up-down direction in a state of facing each other in the left-right direction. The respective sliding portions 111 and 112 protrude outward of the housing main body 22 through the slit 36.

As illustrated in FIG. 1, the EA plate 102 is formed of a material (for example, SPHC) having rigidity lower than that of the EA block 101. The EA plate 102 connects the telescopic movable portion 83 and the EA block 101 to each other. Long holes (first long hole 140 and second long hole 141) are formed in a portion of the EA plate 102 which overlaps the EA block 101 in a plan view. The long holes penetrate the EA plate 102 in the up-down direction, and extend in the front-rear direction. The sliding portions 111 and 112 are respectively fitted into rear end portions of the long holes 140 and 141.

In a case where a load applied to the pipe 12 in the front-rear direction is smaller than a predetermined value, such as during a telescopic operation, the load absorbing mechanism 15 transmits a driving force of the telescopic mechanism 46 to the pipe 12. Specifically, the EA block 101 is moved in the front-rear direction in accordance with the movement of the telescopic coupling portion 82 in the front-rear direction. In this manner, the EA block 101 moves in the front-rear direction together with the EA plate 102 in a state where the respective sliding portions 111 and 112 are fitted into the long holes 140 and 141. In this manner, the pipe 12 is moved in the front-rear direction with respect to the housing 11.

On the other hand, in a case where the load applied to the pipe 12 is equal to or greater than the predetermined value, such as during a secondary collision, the load absorbing mechanism 15 moves the pipe 12 in the front-rear direction with respect to the housing 11 independently of the telescopic mechanism 46. Specifically, in a case where a predetermined load is input forward to the EA block 101, the EA block 101 moves forward with respect to the EA plate 102. In this case, the respective sliding portions 111 and 112 slide on the inner peripheral surfaces of the long holes 140 and 141, thereby plastically deforming the EA plate 102. In this manner, an impact load generated due to the secondary collision is absorbed.

Figure 4:
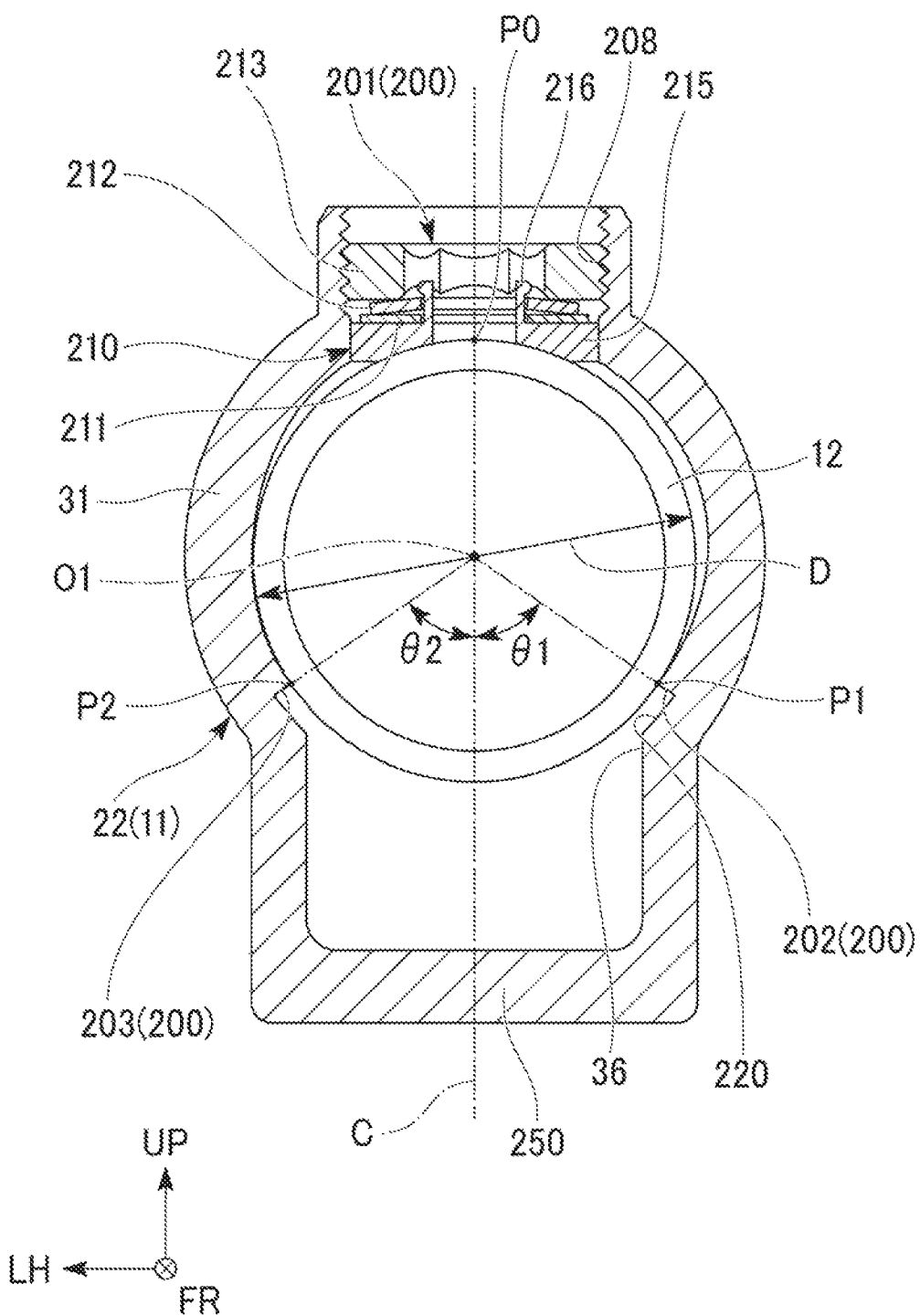
FIG. 4 is a schematic rear view of a pipe, a housing main body, and a support mechanism in FIG. 3.

FIG. 4 is a schematic rear view of the pipe 12, the housing main body 22, and the support mechanism 200.

As illustrated in FIG. 4, the housing main body 22 has the support mechanism 200. The pipe 12 is supported by the housing main body 22 via the support mechanism 200. The support mechanism 200 includes a first support portion 201, a second support portion 202, and a third support portion 203.

The first support portion 201 is in contact with (supported by) the outer peripheral surface of the pipe 12 from above. In the present embodiment, a plurality (for example, two) of the first support portions 201 are provided in a front portion of the holding cylinder 31 at an interval in the front-rear direction. However, since the respective first support portions 201 have the same configuration, one of the first support portions 201 will be described as an example in the following description.

The first support portion 201 is attached inside an attachment hole 208 provided in the holding cylinder 31. The attachment hole 208 penetrates the holding cylinder 31 in the up-down direction, in an upper portion of the holding cylinder 31. The first support portion 201 includes a guide plate 210, a guide washer 211, a spring washer 212, and a guide screw 213.

The guide plate 210 is formed of a material having relatively low sliding resistance, such as a resin material. The guide plate 210 is a member having a circular shape in a plan view. The guide plate 210 includes a pressing portion 215 and a leg portion 216.

The pressing portion 215 is formed in a circular shape having an outer diameter smaller than an inner diameter of the attachment hole 208. The guide plate 210 is accommodated inside the attachment hole 208 in a state where a lower surface of the pressing portion 215 is exposed inside the holding cylinder 31. The lower surface of the pressing portion 215 is formed on a curved surface having a radius of curvature equal to that of the outer peripheral surface of the pipe 12 and smaller than that of the inner peripheral surface of the holding cylinder 31. The lower surface of the pressing portion 215 comes into contact with the outer peripheral surface of the pipe 12 from above. In this manner, the pressing portion 215 supports the pipe 12 to be slidable. It is preferable that an uppermost portion (for example, a portion located on a center line C) of the lower surface of the pressing portion 215 is located inward in the shaft radial direction with respect to the inner peripheral surface of the holding cylinder 31.

In the present embodiment, on the outer peripheral surface of the pipe 12, a support region of the first support portion 201 includes a region directly above the axis O1 (on the center line C extending in the up-down direction through the axis O1). In the present embodiment, a portion located at the center of the support region (directly above the axis O1) is set as a support point P0. However, the support point P0 may be set at a position shifted from the region directly above the axis O1 in the circumferential direction.

The leg portion 216 protrudes upward from the pressing portion 215. For example, the leg portions 216 are provided to face each other in the left-right direction. The leg portions 216 are configured to be elastically deformable in a direction in which both are closer to or separated from each other.

The guide washer 211 is formed in a ring shape in a plan view. The guide washer 211 is superposed on the pressing portion 215 from above in a state where the leg portion 216 is inserted.

The spring washer 212 is formed in a ring shape in a plan view. The spring washer 212 is a leaf spring formed in an arc shape projecting upward in a sectional view. The spring washer 212 is superposed on the guide washer 211 from above in a state where the leg portion 216 is inserted. An upper end portion of the leg portion 216 is locked from above to an opening edge of the spring washer 212. The spring washer 212 is not limited to the leaf spring.

The guide screw 213 is screwed into the attachment hole 208 from above the spring washer 212. That is, the spring washer 212 is pinched between the guide screw 213 and the pipe 12 so that the pipe 12 is biased downward.

In the holding cylinder 31, a notch 220 that crosses the slit 36 in the shaft circumferential direction is formed in a portion including the slit 36. The notch 220 is formed to be recessed downward with respect to the inner peripheral surface of the holding cylinder 31. The notch 220 evenly extends to both sides in the shaft circumferential direction with respect to the center line C in a front view. A width of the notch 220 in the shaft circumferential direction is wider than that of the slit 36. That is, the slit 36 is formed so that a central portion in the circumferential direction of the bottom surface of the notch 220 is recessed downward.

The second support portion 202 is a side end edge located on a first side in the circumferential direction of the opening edge of the notch 220. The third support portion 203 is a side end edge located on a second side in the circumferential direction of the opening edge of the notch 220. That is, each of the support portions 202 and 203 is formed by a corner portion formed by an inner surface facing inward in the shaft circumferential direction in the notch 220 and an inner peripheral surface of the holding cylinder 31. Each portion located on both sides in the shaft circumferential direction with respect to the center line C in the pipe 12 is in contact with each of the support portions 202 and 203 from above in such a way that the pipe 12 is pressed downward by the first support portion 201. That is, the pipe 12 is supported at three points in the circumferential direction by the first support portion 201, the second support portion 202, and the third support portion 203 inside the holding cylinder 31. The length of the notch 220 in the front-rear direction can be appropriately changed as long as the length includes the front end edge of the holding cylinder 31.

In the present embodiment, on the inner peripheral surface of the holding cylinder 31, a portion other than the respective support portions 201 to 203 is separated from the outer peripheral surface of the pipe 12 in the shaft radial direction. Specifically, in a region on an inferior angle side in the shaft circumferential direction between the respective support portions 202 and 203, a gap is provided between the outer peripheral surface of the pipe 12 and the inner peripheral surface of the holding cylinder 31 by the notch 220. On the other hand, in a region on a superior angle side in the shaft circumferential direction between the respective support portions 202 and 203, a gap gradually widened toward the attachment hole 208 is provided between the outer peripheral surface of the pipe 12 and the inner peripheral surface of the holding cylinder 31 within a range leading to the opening edge of the attachment hole 208.

Incidentally, in the steering device 1, when a load is applied to the pipe 12 in the up-down direction or in the left-right direction via the steering shaft 13, there is a possibility that the pipe 12 may be displaced with respect to the housing main body 22. In particular, in a configuration in which the electric telescopic mechanism 46 is mounted as in the present embodiment, a mechanism for tightening the pipe by the housing main body as in the manual telescopic mechanism is not mounted. Accordingly, rattling is likely to occur between the housing main body 22 and the pipe 12. As a result, the displacement amount of the pipe 12 with respect to the housing main body 22 is likely to increase.

Here, a first central angle $\theta 1$ (inferior angle) of the pipe 12 which is formed by a contact point P1 between the outer peripheral surface of the pipe 12 and the second support portion 202 and an intersection point between the center line C and the outer peripheral surface of the pipe 12 is the same as a second central angle $\theta 2$ of the pipe 12 which is formed by a contact point P2 between the outer peripheral surface of the pipe 12 and the third support portion 203 and an intersection point between the center line C and the outer peripheral surface of the pipe 12. In the present embodiment, the respective central angles $\theta 1$ and $\theta 2$ are set in a range of 45° to 60°. However, in the present embodiment, any one of the central angles $\theta 1$ and $\theta 2$ may be set in the range of 45° to 60°.

Figure 5:
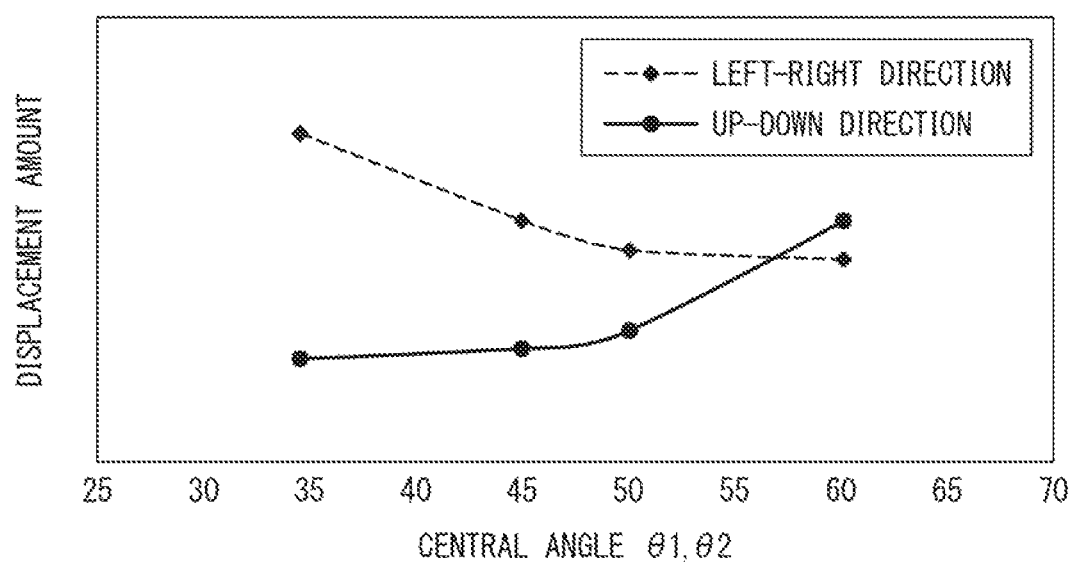
FIG. 5 is a graph illustrating a relationship between a displacement amount of the pipe with respect to the housing main body and a central angle.

The inventor of the present application used a model of the steering device 1 to carry out a test for verifying a relationship between the displacement amount of the pipe 12 with respect to the housing main body 22 and the central angles $\theta 1$ and $\theta 2$. In this test, loads were respectively applied to the rear end portion of the steering shaft 13 in the up-down direction and the left-right direction. The displacement amount with respect to the central angles $\theta 1$ and $\theta 2$ was measured. FIG. 5 is a graph obtained by summarizing results of this test. In FIG. 5, the displacement amount in the up-down direction is illustrated by a solid line, and the displacement amount in the left-right direction is illustrated by a broken line.

First, the pipe 12 is pressed toward the holding cylinder 31 (second support portion 202 and third support portion 203) by the first support portion 201. Therefore, the displacement amount in the up-down direction tends to be smaller than the displacement amount in the left-right direction.

It can be recognized that when the central angles $\theta 1$ and $\theta 2$ are increased in this state, displacement in the left-right direction tends to decrease. The reason is considered as follows. The contact points P1 and P2 are separated from the center line C as the central angles $\theta 1$ and $\theta 2$ increase. Accordingly, the pipe 12 can be more easily held from both sides in the left-right direction. A decreasing tendency of the displacement amount in the left-right direction converges in a range larger than approximately 50°.

On the other hand, when the central angles $\theta 1$ and $\theta 2$ are increased, it can be recognized that the displacement in the up-down direction tends to increase. The reason is considered as follows. The contact points P1 and P2 are separated from the center line C as the central angles $\theta 1$ and $\theta 2$ increase. Accordingly, a space for the pipe 12 to be displaced downward is formed between the contact points P1 and P2. The displacement amount in the up-down direction rapidly increases in the range larger than approximately 50°. The displacement amount in the up-down direction was larger than the displacement amount in the left-right direction at approximately 57°.

Through the above-described test results, in the present embodiment, it is preferable that the central angles θ1 and θ2 are set to 45° to 60° as a range for suppressing variations in the displacement amount in both the up-down direction and the left-right direction. That is, since the central angles θ1 and θ2 are set to 45° or larger, the contact points P1 and P2 are separated from the center line C. In this manner, the pipe 12 can be easily held in the left-right direction, and the displacement amount of the pipe 12 in the left-right direction can be reduced.

On the other hand, since the central angles θ1 and θ2 are set to 60° or smaller, it is possible to suppress an excessive increase in the displacement amount of the pipe 12 in the up-down direction.

As a result, the support portions 201 to 203 can be evenly and easily disposed in the shaft circumferential direction. Accordingly, a difference (variation) in the displacement amounts in the respective directions can fall within a predetermined range. In this manner, the pipe 12 can be stably supported by the housing 11, and a commercial value can be improved.

In the present embodiment, the difference in the displacement amounts in the respective directions can be reduced by setting the central angles θ1 and θ2 in the range of 55° to 60°.

Incidentally, a load tends to be more easily applied to the pipe 12 in the up-down direction than in the left-right direction. An occupant tends to feel a sense of discomfort in the displacement in the up-down direction than the displacement in the left-right direction. Therefore, in the steering device 1, for example, in some cases, it is desirable to reduce the displacement amount in the left-right direction while suppressing the increase in the displacement amount in the up-down direction. In this case, it is preferable to set the central angles θ1 and θ2 in the range of 45° to 50°. In this manner, it is possible to reduce the displacement amount in the left-right direction while suppressing the excessive increase in the displacement amount in the up-down direction.

In the present embodiment, the side end edges facing each other in the circumferential direction out of the opening edges of the notch 220 are configured to function as the second support portion 202 and the third support portion 203.

According to this configuration, contact between the housing main body 22 and the pipe 12 can be avoided by the notch 220, and the pipe 12 can be stably supported by the side end edges facing each other in the circumferential direction out of the opening edges of the notch 220. In this case, for example, compared to a case where the support portion is formed by a projection, a working amount of the pipe 12 for forming the support portions 202 and 203 can be reduced. As a result, workability or rigidity of the support portions 202 and 203 can be improved.

In the present embodiment, a configuration is adopted in which the recessed slit (recess portion) 36 is formed with respect to the bottom surface of the notch 220, and the EA block (coupling portion) 101 of the load absorbing mechanism (coupling portion) 15 is disposed inside the slit 36.

According to this configuration, the notch 220 is formed separately from the slit 36. Accordingly, the positions of the support portions 202 and 203 can be set regardless of the size of the slit 36. In this manner, it is easy to set the central angles θ1 and θ2 to desired values.

In the present embodiment, the telescopic motor unit (actuator) 81 of the telescopic mechanism 46 is fixed to the housing 11. Accordingly, the telescopic motor unit 81 does not need to move during the telescopic operation. Therefore, it is not necessary to secure a movement space for the telescopic motor unit 81 around the steering device 1, and layout designing can be improved.

Moreover, even in the electric telescopic mechanism 46 as in the present embodiment, the pipe 12 can be stably supported by the support portions 201 to 203. Accordingly, it is possible to suppress variations in the displacement amount of the pipe 12 with respect to the housing main body 22 in the up-down direction and the left-right direction. As a result, a commercial value can be improved.

Hitherto, the preferred embodiment according to the present disclosure has been described. However, the present disclosure is not limited to the embodiment. Additions, omissions, substitutions, and other modifications of the configurations can be made within the scope not departing from the concept of the present disclosure. The present disclosure is not limited by the above-described configurations and is limited only by the appended claims.

For example, in the above-described embodiment, a configuration has been described in which the axis O1 intersects the front-rear direction. However, the present disclosure is not limited to the configuration. The axis O1 may coincide with the front-rear direction of the vehicle.

In the above-described embodiment, a case has been described where the telescopic mechanism 46 is the feed screw mechanism. However, the present disclosure is not limited to the configuration. For example, the telescopic mechanism 46 may adopt a gear.

In the above-described embodiment, a configuration has been described in which the motor unit is provided in the housing 11. However, the present disclosure is not limited to the configuration. The motor unit may be provided in the pipe 12.

In the above-described embodiment, the electric steering device 1 has been described in which the telescopic operation or the tilt operation is performed by the actuator (drive mechanism 14). However, the present disclosure is not limited to the configuration. The steering device may manually perform the telescopic operation or the tilt operation.

In the present embodiment, a case has been described where the slit 36 and the notch 220 are provided at overlapping positions in the circumferential direction. However, the present disclosure is not limited to the configuration. In the housing 11, the slit 36 and the notch 220 may be provided at different positions, or the slit 36 and the notch 220 may be shared with each other. The housing 11 may have a configuration that does not have the slit 36.

In the above-described embodiment, a configuration has been described in which the second support portion 202 and the third support portion 203 are the side end edges of the notch 220. However, the present disclosure is not limited to the configuration. The second support portion 202 and the third support portion 203 may be projections projecting in a case radial direction from the inner peripheral surface of the holding cylinder 31.

The first support portion 201 may also be the projection instead of the configuration in which the pipe is biased by the spring washer 212.

In the above-described embodiment, a configuration has been described in which the first support portion 201 is located above the pipe 12, and the second support portion 202 and the third support portion 203 are located below the pipe 12. However, the present disclosure is not limited to the configuration. The first support portion 201 may be located below the pipe 12, and the second support portion 202 and the third support portion 203 may be located above the pipe 12.

In the above-described embodiment, a configuration has been described in which the central angles θ1 and θ2 are the same as each other. However, the present disclosure is not limited to the configuration. The central angles θ1 and θ2 may be different from each other.

In the above-described embodiment, a configuration has been described in which the telescopic mechanism 46 and the pipe 12 are connected to each other via the load absorbing mechanism 15. However, the present disclosure is not limited to the configuration. The telescopic mechanism 46 and the pipe 12 may be directly connected to each other (the load absorbing mechanism 15 may not be provided).

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description, and is only limited by the scope of the appended claims.

What is claimed is:

1. A steering device comprising:
    a pipe into which a steering shaft is inserted to be rotatable around an axis along a front-rear direction;
    a housing supported by a vehicle body and supporting the pipe to be movable in the front-rear direction; and
    a telescopic mechanism moving the pipe with respect to the housing in the front-rear direction,
    wherein the housing includes
        a first support portion located on a center line passing through the axis along an up-down direction, and supporting the pipe from a first side in the up-down direction,
        a second support portion located on a first side in a circumferential direction around the axis with respect to the center line, and supporting the pipe from a second side in the up-down direction, and
        a third support portion located on a second side in the circumferential direction around the axis with respect to the center line, and supporting the pipe from the second side in the up-down direction,
    when the pipe is viewed in the front-rear direction, a central angle of the pipe formed by any one contact point of a contact point between an outer peripheral surface of the pipe and the second support portion and a contact point between the outer peripheral surface of the pipe and the third support portion, and an intersection point between the center line and the outer peripheral surface of the pipe is set in a range of 45° to 60°,
    a notch that is open inward in a radial direction intersecting with the axis is formed in a portion of the housing which is located between the second support portion and the third support portion,
    the second support portion and the third support portion are side end edges facing each other in the circumferential direction, out of opening edges of the notch,
    the housing has a recess portion recessed from a bottom surface of the notch and having a narrower width in the circumferential direction than that of the notch, and
    a coupling portion for coupling the telescopic mechanism and the pipe is disposed inside the recess portion.

2. The steering device according to claim 1, wherein the central angle is set in a range of 45° to 50°.

3. The steering device according to claim 1, wherein the central angle is set in a range of 55° to 60°.

4. The steering device according to any one of claim 1, wherein the telescopic mechanism includes
    an actuator provided in the housing, and
    a feed mechanism for connecting the pipe and the actuator to each other, and transmitting a driving force of the actuator to the pipe.

* * * * *